United States Patent [19]
Johnson

[11] 3,946,844
[45] Mar. 30, 1976

[54] CLUTCHING MEANS ADAPTED FOR TAPPING ATTACHMENTS

[75] Inventor: Allan S. Johnson, Newport Beach, Calif.

[73] Assignee: Tapmatic Corporation, Irvine, Calif.

[22] Filed: Nov. 4, 1974

[21] Appl. No.: 520,409

Related U.S. Application Data

[63] Continuation-in-part of Ser. No. 508,344, Sept. 23, 1974, abandoned.

[52] U.S. Cl. .............. 192/67 R; 64/23.7; 74/378; 74/447; 192/21; 192/51; 192/108
[51] Int. Cl.² ..................................... F16D 11/00
[58] Field of Search ....... 64/23.7, 9 A; 74/337, 378, 74/447; 192/21, 51, 67 R, 108; 408/139

[56] References Cited
UNITED STATES PATENTS

| 583,655 | 6/1897 | McCann | 74/447 X |
|---|---|---|---|
| 2,291,151 | 7/1942 | Dunn | 192/67 R X |
| 3,050,321 | 8/1962 | Howe et al. | 192/67 R X |
| 3,145,401 | 8/1964 | Burg | 192/51 X |
| 3,325,837 | 6/1967 | Hartmann | 408/139 |
| 3,521,314 | 7/1970 | Steiner | 408/139 |
| 3,651,708 | 3/1972 | Muller | 74/447 |
| 3,656,858 | 4/1972 | Eriksson | 408/139 |
| 3,797,276 | 3/1974 | Orain | 64/23.7 |

Primary Examiner—Allan D. Herrmann
Attorney, Agent, or Firm—Herzig & Walsh Incorporated

[57] ABSTRACT

The invention is an improved clutching means for tapping attachments and particularly adaptable in attachments having free axial float. Direct and reverse drive is provided for by way of planetary gears for driving in direct and reverse drive in the exemplary attachment in which the clutching means is embodied. An adjustment is provided for depth. Spring biased clutch drive members are provided for both the direct and reverse drive providing a narrow, neutral position. Each clutch driver member is in the form of a sleeve having a ball race carrying driving balls interposed between axial splines on a driving part and on the driven spindle. The splines have arcuate side surfaces to confrom to the driving balls providing for substantially frictionless drive in both direct and reverse modes, the balls being free to roll. The splines are especially configurated to facilitate engagement of the balls with them. In one form the splines have slanted or inclined end surfaces to achieve this purpose and in a preferred form the splines have arcuate side and end surfaces forming a continuous oval shaped track.

13 Claims, 15 Drawing Figures

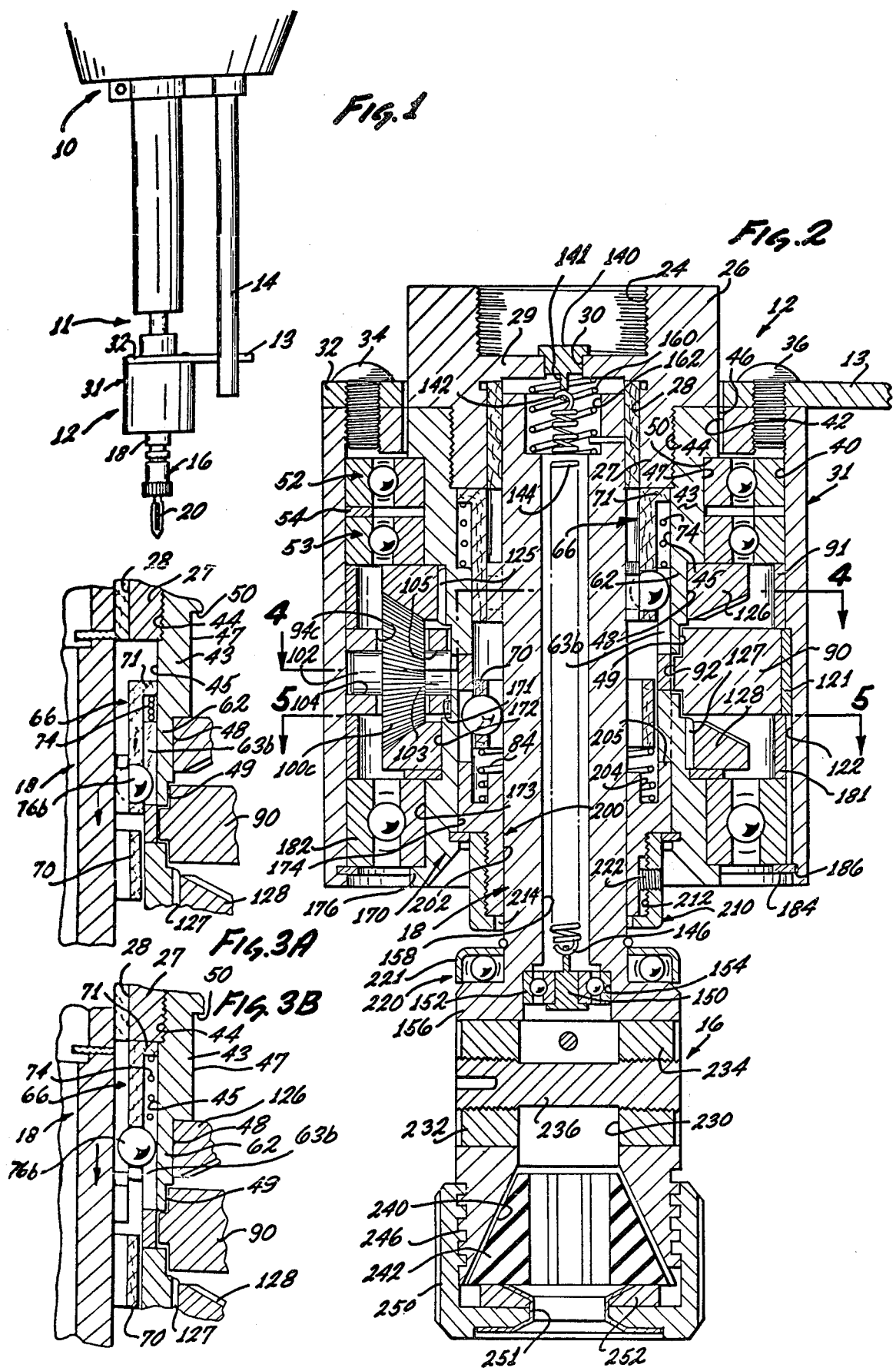

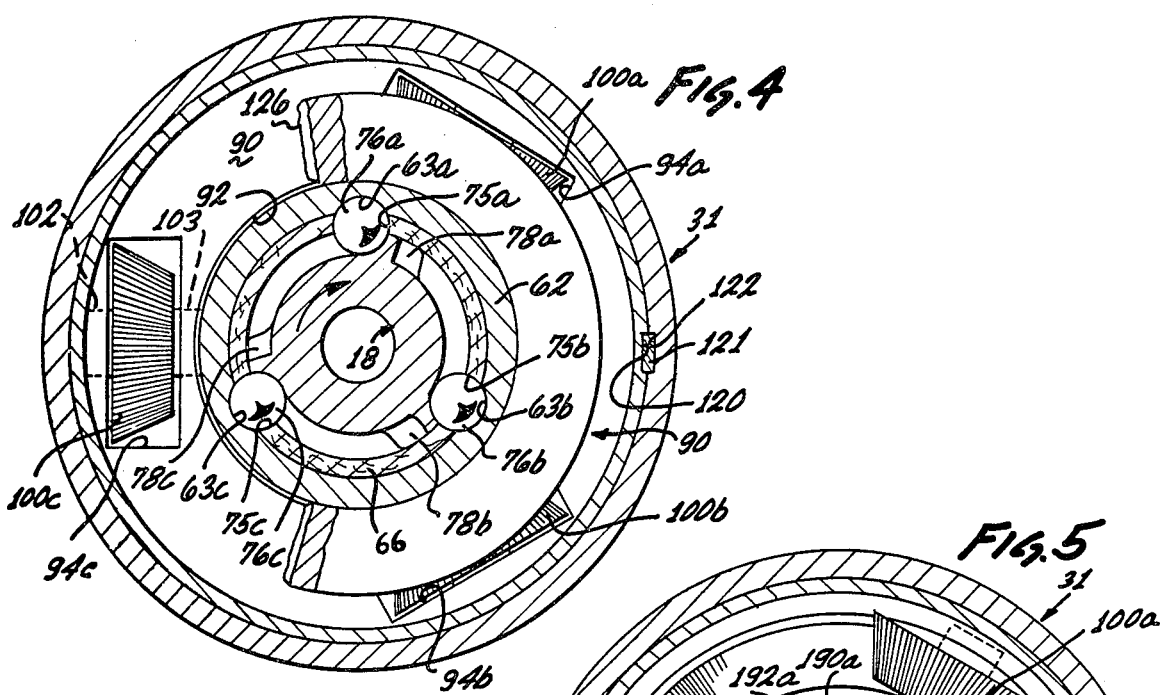
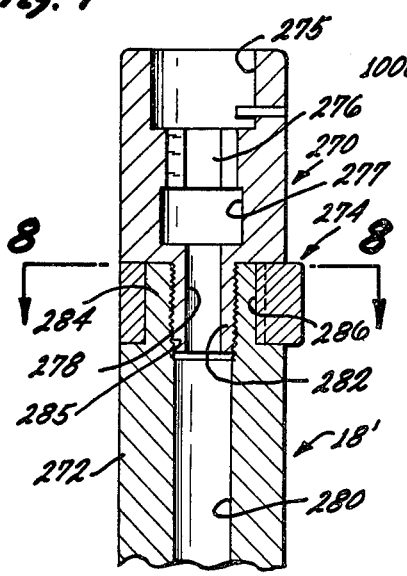
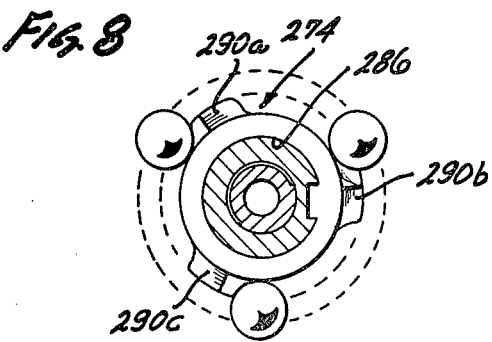
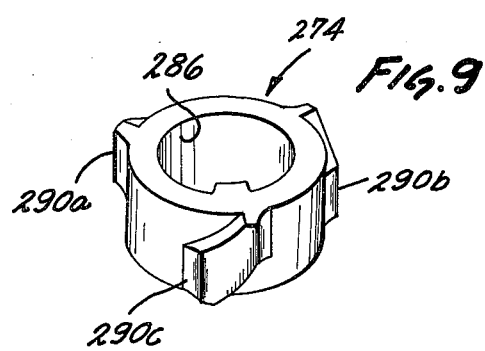

CLUTCHING MEANS ADAPTED FOR TAPPING ATTACHMENTS

This application is a continuation-in-part of Ser. No. 508,344 filed on Sept. 23, 1974 and now abandoned.

BACKGROUND OF THE INVENTION

1. Field of the Invention

The field of the invention is that of clutching means particularly adapted for tapping attachments. The exemplary forms of the invention are embodied in tapping attachment of the type having free axial float and providing for both direct and reverse drive. Improvements are provided in the device as described in detail herein, particularly adapting it for substantially frictionless drive of the tapping spindle. The drive is through clutch members which provide for engagement and disengagement without chattering. The drive is through ball members engageable with splines of special configuration to accommodate the purposes described hereinafter.

2. Description of the Prior Art

The background of the invention with respect to tapping attachments is exemplified in prior patents of this inventor U.S. Pat. Nos. 3,002,206; 3,041,893; 3,397,588; 3,717,392; and 3,791,756, which are hereby incorporated herein by reference. Reference is also made to U.S. Pat. No. 2,325,184. The background patents disclose the characteristics of tapping attachments having free axial float and direct and reverse drive. U.S. Pat. No. 3,397,588 discloses a type of construction wherein for the direct drive there is provided a spring biased clutch driver member which functions to eliminate chattering, when the clutch engages or disengages for direct drive. A similar clutch driver member may be and has been embodied in attachments having reverse drive as in U.S. Pat. No. 3,717,892. The herein invention improves particularly on the clutch driver members and their cooperation with the drive means and spindle.

SUMMARY OF THE INVENTION

The improvements of the herein invention are adapted to realizing the objective that the drive of the floating spindle in a tapping attachment is accomplished substantially without friction, while still having the advantages and capabilities of the patents referred to. The realization of this end is an objective of the invention. The reverse drive is by way of planetary gears in such a way that the driving speed can be the same in direct drive as in reverse drive or it can be different. Spring biased clutch drive members are provided for both direct and reverse drive. An adjustment collar is preferably provided on the attachment which cooperates with the tapping spindle to provide depth control as shown in U.S. Pat. No. 3,717,892, incorporated herein by reference. This adjustment in combination with the spring biased clutch driver members makes it possible to have a very narrow neutral zone or area between direct and reverse drive, as in the patents referred to. The clutch driver members provide drive through balls carried by a spring biased sleeve (clutch driver member). The balls engage between axial splines on a clutch driving sleeve and on the tapping spindle, the splines having arcuate sides corresponding to ball radius allowing the balls to rotate while moving axially providing substantially frictionless drive.

The splines have their top and bottom ends formed or configurated on a slant, that is at an angle to the axis of the spindle. The upper and lower end edges are parallel. These slanted ends form an upper corner point and a lower corner point. The spindle moves axially to provide for engagement and disengagement for direct drive and for engagement and disengagement for reverse drive. These functions are facilitated by the upper and lower corner points, and the arcuate sides of the splines. As can be seen, upon engagement of the balls with the splines, the corner points facilitate the balls coming into position into engagement with the arcuate spline side grooves.

A further improvement resides in a modified form of spline. This modification carries forward the principle explicated in the foregoing. In this modification the top and bottom edges of the splines are generally horizontal and these ends as well as the sides are formed with an arcuate groove corresponding to the radius of the drive balls. These splines are essentially oval shaped or race track shaped with a continuous arcuate groove around the sides of the splines. As can be seen, this modification further facilitates the engagement of the driving balls with the splines both in direct and reverse drive. It may be seen that whenever the balls move axially so as to engage the splines upon contacting the splines the contact will be made with an arcuate or grooved surface, which by cam action causes the balls to roll essentially without friction into desired positions for engagement with grooves at one side or the other of the splines.

As may be observed, the invention basically is an improved clutching arrangement which facilitates clutching engagement between a driving and driven member and improves the driving relationship.

The specific nature of the improvements are described in detail hereinafter in connection with preferred exemplary forms of the invention.

In the light of the foregoing, further specific objects of the invention are as follows:

Another object is to provide mechanism capable of substantially frictionless drive without chattering or knocking with respect to both direct drive and reverse drive clutching and declutching.

A further object is the realization of a tool of this type, having the improved characteristics set forth and with a very few parts subject to wear, and having long and maintenance free life.

Another object of the invention is to realize a mechanism having parts which are easy to fabricate and particularly that the splines themselves are provided on an easily replaceable part.

A further object is to realize a tool of this type wherein the danger of damage or breakage of the tool when operated is minimized.

A further object is to achieve or realize the foregoing objects by way of specific improvements, residing in ball driving members interposed between rotating parts and co-operating with splines on one of the parts wherein the splines are provided with arcuately grooved side edges, the grooves having a radius corresponding to that of the balls. A corollary object is to provide these splines with slanted or biased upper and lower ends providing upper lower and corner points to facilitate the engagement between balls and splines.

A further object is to achieve or realize the foregoing objects by way of specific improvements in the splines, residing in that the upper and lower ends of the splines as well as the sides, are provided with arcuate grooves having a radius corresponding to that of the balls so that in effect a continuous oval track is provided completely around the splines.

Further objects and additional advantages of the invention will become apparent from the following detailed description and annexed drawings wherein:

FIG. 1 is a view of a preferred form of the tapping attachment mounted on a machine;

FIG. 2 is a cross-sectional view of the tapping attachment of FIG. 1;

FIGS. 3A and 3B are partial views illustrating the clutch driver member or sleeve, for direct drive in different positions;

FIG. 4 is a sectional view taken along the line 4—4 of FIG. 2;

FIG. 5 is a sectional view taken along line 5—5 of FIG. 2;

FIG. 6b is an elevational view of the spindle section and splines of FIGS. 6 and 6a;

FIG. 7 is a partial cross-sectional view of a modification wherein the splines are on a removable part of the spindle.

FIG. 8 is a sectional view taken along line 8—8 of FIG. 7.

FIG. 9 is a detail view of a replaceable part having splines.

DESCRIPTION OF THE PREFERRED EMBODIMENTS

Figure 6:
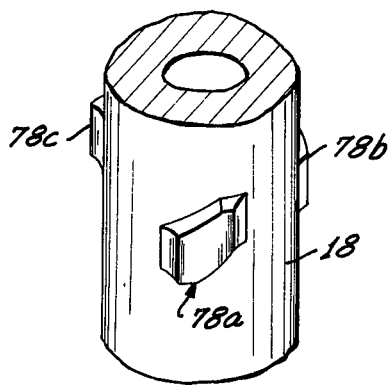
FIG. 6 is a detail view of a part of the spindle illustrating the configuration of the splines.

Referring now more in detail to the various figures of the drawing, numeral 10 designates a machine tool with which the attachment embodying the invention may be used. It has an arbor 11 and the tapping attachment is designated generally at 12. Numeral 13 designates a radial holding arm which engages a stop rod or column 14 which will hold the body of the attachment against rotation as will be described more in detail hereinafter. Numeral 16 designates the chuck on the tapping spindle 18 and the tap itself is designated at 20.

The tool arbor 11 is threaded and it engages a bore 24 in the body 26. Body 26 has a lower part 27 of smaller diameter that is threaded as shown. It has a bore 28 with web 29 between bores 24 and 28, web 29 having bore 30 in it.

Numeral 31 designates a cylindrical housing having a top cover 32 held on by screws 34 and 36. Arm 13 extends from cover 32. The housing 31 has a bore 40 and a counter bore 42. Numeral 43 designates a cylindrical clutch sleeve having threaded bore 44 threaded onto body 26. The clutch sleeve has a bore 45 and outer diameters 46, 47, 48, and 49.

Within the bore 40 between housing 31 and clutch sleeve 43 engaging square shoulder 50 of clutch sleeve 43 is a ball-bearing designated generally at 52 and which comprises the usual ball races and interposed balls. Numeral 53 designates a separate similar ballbearing with spacer 54 between them. The parts of the attachment are shown assembled in FIG. 2 and in the cross-sectional views.

The clutch sleeve 43 has a counter bore 45 in its skirt 62. It has axial ways as shown at 63a, b, and c, which engage with and drive balls that are carried by a direct drive clutch driver member as will be described. The relationship of the parts as so far described may be observed by considering the sectional views FIGS. 2, 3A, 3B, 4 and 5.

Numeral 43 designates the clutch driver member or sleeve for direct drive and numeral 170 designates the clutch driver member for reverse drive. In the fabrication and production of parts as will be observed, these two parts are very similar, as will be noted.

The member 66 is a sleeve having flange 71 within clutch sleeve 43. It is cylindrical and is biased by spring 74. The three angularly spaced axial grooves or splines 78a, b, and c are arcuate to conform to the radius of driving balls as will be described. Sleeve 66 forms a skirt or ball race and formed in the skirt are three equally angularly spaced ball receiving opensings 75a, b, and c (see FIG. 4). Received in the openings are driving balls 76a, b, and c. The balls engage splines 78a, b, and c, on spindle 18 (see FIGS. 6 6a, and 6b). The splines have arcuate axial sides of a radius conforming to that of the balls. Referring to spline 78a, FIG. 6, its axial sides 79 and 80 are arcuate, having a radius corresponding to that of the balls. The upper and lower ends, 81 and 82, are at an angle or slant, but are parallel, forming upper and lower corner points 83 and 84 for a purpose which will presently be described.

The member 70 for reverse drive is similar to the member 66 but does not have the flange 71. It similarly provides a ball race carrying similar balls that cooperate with corresponding splines, as will be referred to again presently. It is biased upwardly by spring 84.

Numeral 90 designates a cylindrical cage member within the housing 31 which supports the planetary gears of the gear drive. This cage has a central bore 92 through which skirt 62 extends. It has cutouts or openings 94A, B and C which provide for spaces to receive the three planetary drive gears as will be described.

The three planetary drive gears are shown best in FIG. 5 as designated at 100A, B and C positioned as shown in the cutouts of the cage 68. These gears have shafts or arbors as designated at 102 and 103 for gear 100C in FIG. 2. The ends of these shafts are received in bores formed in the cage 90 as designated at 104 amd 105. The cage 90 has an axial groove 120 whereby it can be keyed by way of a key 121 to a corresponding axial groove 122 on the inside of the housing 31 to hold the cage against rotation.

The planetary gears are bevel gears and cooperating with them are two bevel drive gears including the direct drive bevel gear 126 and the reverse drive bevel gear 128. The opening in these bevel gears is of a configuration to accommodate them to the clutch drive members, as will be described.

FIG. 2 shows the assembled relationship of the planetary gears, the direct drive gear 126 and the direct drive clutch driver member 132.

Positioned in the bore 30 in the body 26 is a spring retainer 140. The member 140 has a lug 141 and hooked into it is a hook 142 on the end of a suspension spring 144 which has a hook 146 at its opposite end which hooks into the end of support member 150 that extends through a ball bearing 152 in a counter bore 154 in the cylindrical end part 156 of the spindle 18, which has axial bore 158.

It is to be observed that there is a coil spring 160 positioned in counterbore 162 of the spindle 18 between the spindle and web 29 whereby the spindle is allowed to move against this bias, cushioning the spindle.

Referring to the Figures, numeral 170 designates the reverse clutch drive sleeve. The reverse clutch driver member of sleeve 170 engages in the opening of the reverse drive bevel gear 128 in the same manner that the direct drive clutch driver member or sleeve 66 engages in the direct clutch drive sleeve 43. The sleeve 170 has diameters 171, 172, and 173, and bore 174, and flange 176 which, as shown in FIG. 2, is under ball-bearing 182 which is interposed between the sleeve 170 and the housing 31. The ball-bearing 182 is positioned by a snap ring 184 received in annular groove 186 in the housing 31 (see FIG. 2). The sleeve 170 has diameter 172 fitting within gear 128.

The sleeve 170 has a bore 174 (see FIG. 2) and received in this bore is a spindle bearing member or bushing 200 having a bore 202 and an upper counter bore 204 in an upper enlarged part 205. Retained in the counter bore 204 is coil spring 84 which corresponds to the spring 74, this being a biasing spring which biases the reverse drive clutch driver member 70 permitting it to move axially in the same way and for the same purpose as the upper clutch driver member 66 moves.

Numeral 210 designates an adjustment collar which has internally threaded bore 212, the collar being threaded on to the threaded part of the spindle-bearing 200. This collar is in the form of a cap having an end part which has a bore 214 through which the spindle 18 extends. In operation, the spindle 18 can float as described in the previous patents, being suspended by the spring 144. The amount of this float is adjustable by adjusting the position of collar 210 on the bearing 200, that is by way of adjusting the position of the end of the collar relative to the chuck 16 on the end of the spindle, so that the axial float may be adjusted from any maximum amount to a minimum 1/16 inch for example. Collar 210 can engage thrust bearing 220 limiting the degree of freedom of float while in direct drive.

The thrust bearing 220 comprises a flange member 221 as shown, within which is a ball race with balls that bears on the top surface of the chuck or tap holder 156. The collar 210 can be adjusted to a set position, which determines the relative position of the spindle 18 in the attachment, and therefore determines the amount of relative movement that will cause the direct clutch drive to release and, therefore, serving as a depth of control. The position of the collar 262 can be set by screw 264.

The tap holder or chuck 16 is of conventional construction, being a cylindrical shape, having a bore at 230 with tap holding jaws 232 and 234, actuatable by threaded stem 236. The lower end of the bore 230 is flared outwardly or tapered as shown in 240. In this tapered part is received an expansible, collapsible tap collet 242, adapted to receive and hold tap 20. The end of the spindle is threaded as shown at 246 to receive the chuck nut 250. Between the chuck nut 250 which has a bore 251 and the collet 242 is a washer 252, having a tapered bore as shown.

In the light of the foregoing description and the disclosures contained in the prior patents, those skilled in the art will readily understand the operation of the attachment and will fully understand and appreciate the manner in which the objective set forth in the foregoing are realized.

The tap holding spindle has the characteristic of free axial float which is limited as described in the foregoing, the axial float being like that described in the previous patents. The tap follows its own lead. No lead pressure is applied. The machine moves the machine spindle behind the lead of the tap until the desired depth is reached. The direct drive bevel gear 126 is driven from the body 26 by reason of its engagement therewith as described in the foregoing. Body 26 drives the direct drive clutch driver member 43 by reason of its engagement therewith as described. In operation, it will be understood that the attachment as it starts tapping, moves forwardly with spindle 18 advancing relatively to the housing 31. The adjustment collar 210 can be adjusted to a spacing as between it and the chuck 16 so that when the tool reaches the limit of its travel, that is, as determined by the setting of collar 210, the balls 76a, b, and c. will move down with the member 66 as shown in FIG. 3A, the splines on spindle 18 moving down relatively. Since the balls can roll while moving axially, the drive is transmitted substantially without friction. Friction causes member 66 to be moved down against spring 74. When the extending corners on the splines 78a, b, and c, as shown at 81 in FIG. 6 reach the centers of the balls, the clutch releases, the parts moving back into the position of FIGS. 2 and 3B. The direct drive clutch driver member disengages without knocking or chattering as described in U.S. Pat. Nos. 3,397,588 and 3,717,892, and the reverse drive clutch driver member disengages similarly without chattering or knocking; it too is cushioned by a biasing spring, this being the spring 84.

Figure 6A:
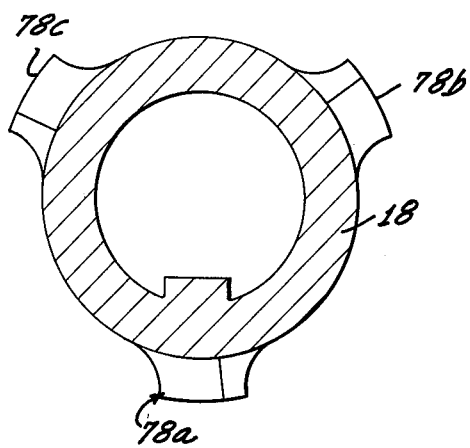
FIG. 6a is a transverse cross-sectional view through the spindle and through the splines of FIG. 6.
Figure 6B:
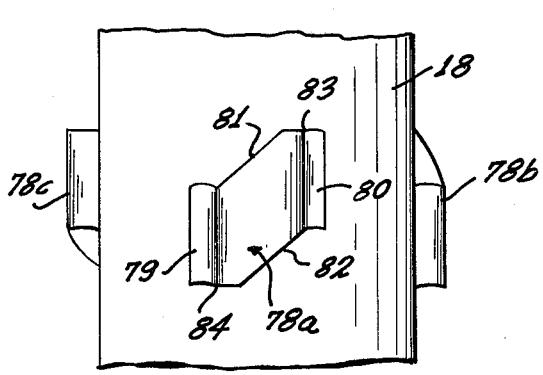

The configuration of the splines as shown in FIGS. 6, 6a, and 6b, facilitates engagement in both direct and reverse drive. As may be seen, if the balls engage surfaces 81 or 82 or corners 83 or 84, the balls can readily roll to come into engagement with an arcuate side of the splines.

The neutral position of the spindle in between direct and reverse drive can be very sensitive; that is, very narrow. The spindle preferably feeds in and out at the same rate and drives at the same speed in direct and reverse drive. The adjustable collar 210 is adjusted with respect to the chuck or spindle so that when the tap has reached the specified depth, movement of the spindle of the machine is stopped without stopping the rotation. The tap is still turning in the work and it pulls the spindle down the small amount necessary to bring the drive balls into neutral position after which the engagement can then be made in the manner described for reverse operation.

FIGS. 7-9 show a modified form of the invention wherein the driving splines on the spindle are formed on a separate part or component for purposes of realizing certain advantages. This part or component can then be readily fabricated by appropriate techniques and it is readily, and economically replaceable for purposes of repair or substitution. The modified spindle as shown in these figures is essentially like that of the previous embodiment except as described hereinafter. The spindle has an upper portion 270 and a lower portion 272. The splines are on a separate intermediate cylindrical portion as designated at 274. The upper part 270 has a counterbore 275, a hexagonal counterbore 276 to accommodate a hexagonal wrench, and clearance bore 277 and a bore 278 which corresponds to the bore 158 of the previous embodiment, which accommodates the suspension spring. The lower portion 272 of the spindle has a corresponding bore 280. The power portion of part 272 is shown broken away, it being like that of the previous embodiment.

The upper part 270 has an extended threaded nipple 282. The lower part 272 has an extending boss part of a smaller diameter as designated at 284 and it has a threaded bore 285 of a size to have the nipple 282 threaded into it. The replacement part 274 has an outer diameter corresponding to the diameters of the upper part 270 and the lower part 272 and it has a bore 286 of a size to be received on the extending boss 284. It has an axial extent corresponding to that of the boss 284 to be positionable about this boss, in between the upper and lower parts of the spindle. The replaceable part 274 has on it the splines 290a, b, and c, which have a configuration corresponding to the splines as previously described in connection with the previous embodiment, and thus, they need not be described in detail again.

The modified spindle can be readily disassembled to remove and replace the component 274 carrying the splines. The upper part 270 can be unthreaded from the threads in the boss 284 by means of a wrench fitted into the hexagonal hole 276. Upon separation of the parts 270 and 272, the component 274 can readily be removed and it is readily replaceable. The modified spindle is installed in the attachment in the same manner as the spindle is installed in the previous embodiment and as shown in the previous figures.

Figure 10:
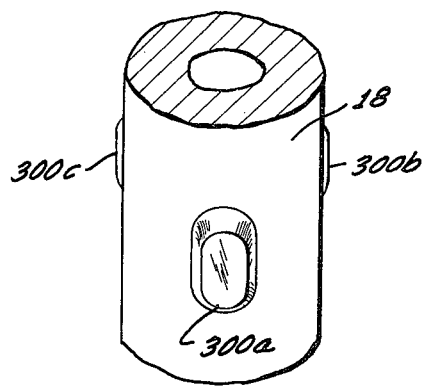
FIG. 10 is a partial perspective view of a spindle having a modified form of splines.
Figure 11:
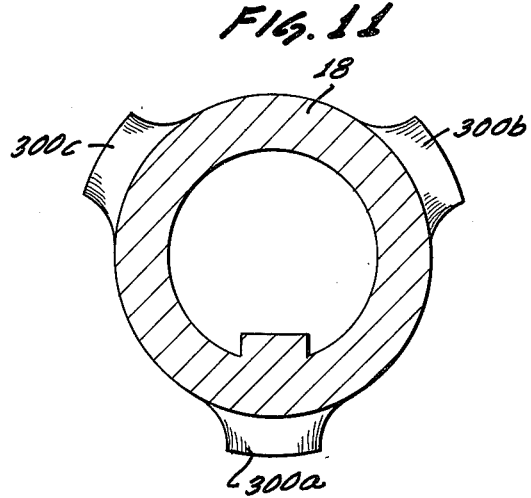
FIG. 11 is a transverse sectional view through the spindle and splines of FIG. 10.
Figure 12:
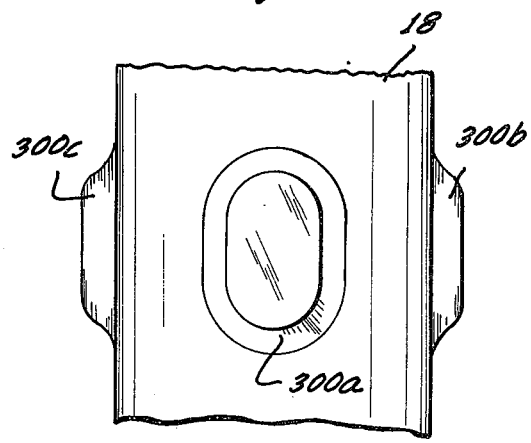
FIG. 12 is an elevational view of the section of spindle of FIGS. 10 and 11 showing the spline configuration.

FIGS. 10, 11 and 12 show a modified form of splines as designated at 300a, b, and c. As may be observed, from FIGS. 10, 11 and 12, the spline 300a has an arcuate groove all the way around it, that is, along the sides and the top and bottom, forming an oval "racetrack", the groove having a radius corresponding to that of the balls.

The function of the particular configuration of the splines in FIGS. 6, 6a, 6b, and FIGS. 10, 11, and 12, as well, will be readily understood and appreciated by those skilled in the art. The function of the splines in FIGS. 6, 6a, and 6b has been previously explained. This function is further improved and perfected in the modification of FIGS. 10, 11, and 12, wherein this can be seen by reason of the continuous oval configuration. Irrespective of where balls come into engagement with the splines, either at the top or bottom, they will engage the arcuate track causing relative motion between the balls and the spindle and splines, which as respects the balls will be frictionless rolling motion whereby the balls come into the desired engagement with one side or the other of the splines.

The foregoing disclosure is representative of a preferred form of the invention and is to be interpreted in an illustrative rather than a limiting sense, the invention to be accorded the full scope of the claims appended hereto.

I claim:

1. In coupling means for transmitting torque, in combination, a first rotating member, a second axially aligned rotating member, said members being relatively movable axially, means for transmitting rotary drive from one member to the other, said means including at least one ball member positioned between the members, both members having axial configurations engageable with the ball member whereby drive is transmitted through the ball member, a circular carrier for said ball member, resilient means biasing the circular carrier, said ball member having rolling engagement to move said carrier against said resilient means upon relative movement of said rotating members.

2. Coupling means as in claim 1 wherein said configurations on one of said rotating members are splines having ball engaging surfaces that are arcuate in cross-section having a radius of curvature to accommodate rolling movement of the ball member, the splines being spaced angularly an amount greater than the diameter of the ball member.

3. Coupling means as in claim 2 including a plurality of said ball members, and each of said rotating members having a number of splines corresponding to the number of ball members.

4. Coupling means as in claim 1 wherein said circular holder is a sleeve between the rotary members, and spring means urging said sleeve in one direction.

5. Coupling means as in claim 1 wherein said biasing means is positioned to resist said axial movement of the holder and to quickly reposition said holder and ball upon disengagement of the ball from the end of a spline.

6. Coupling means as in claim 1 wherein the second rotating member is a spindle of a tapping attachment.

7. Coupling means as in claim 6, a tapping attachment carrying the said spindle, and means for transmitting reverse rotary drive from one member to the other including a second similar ball member, a circular carrier for the second ball member, and second resilient means biasing the second circular carrier.

8. In coupling means for transmitting torque, in combination, a first rotating member, a second axially aligned rotating member, said members being relatively movable axially, means for transmitting rotary drive from one member to the other, said means including at least one ball member positioned between the members, and both members having configurations engageable with the ball member whereby drive is transmitted through the ball member, said configurations on the members being axial splines, said splines having ball engaging surfaces that are arcuate in cross-section having a radius of curvature to accommodate rolling movement of the ball member, one of the rotating members being a cylindrical tapping spindle, said spindle having a removable section having said splines formed on it.

9. Coupling means as in claim 8 wherein said spindle is formed in two separable parts, said removable section being ring shaped and positioned between the said parts.

10. In coupling means for transmitting torque, in combination, a first rotating member, a second axially aligned rotating member, said members being relatively movable axially, means for transmitting rotary drive from one member to the other, said means including at least one ball member positioned between the members, and both members having configurations engageable with the ball member whereby drive is transmitted through the ball member, said configurations on the members being axial splines, the splines having at least one end surface positioned at an angle to the axis of the member whereby to be on a slant so that a ball engaging the spline causes relative movement to bring the ball into engagement with the side of the spline.

11. Coupling means as in claim 10 wherein the said end of the spline and an adjacent side form a corner point such that when the corner point reaches the center of a ball, disengagement occurs.

12. Coupling means as in claim 10 wherein said spline has both ends formed to corresponding angles so as to be on a slant.

13. In coupling means for transmitting torque, in combination, a first rotating member, a second axially aligned rotating member, said members being relatively movable axially, means for transmitting rotary drive from one member to the other, said means including at least one ball member positioned between the members, and both members having axial configurations engageable with the ball member whereby drive is transmitted through the ball member, said configurations on the members being axial splines, said splines having ball engaging surfaces that are arcuate in cross-section having a radius of curvature to accommodate the rolling movement of the ball member, the said splines having end surfaces that are arcuate in cross-section, corresponding to the radius of the ball, the side and end surfaces being joined to form a continuous movable arcuate track around the splines.

* * * * *